United States Patent [19]
Satoh

[11] Patent Number: 5,786,885
[45] Date of Patent: Jul. 28, 1998

[54] IMAGE PROCESSING SYSTEM

[75] Inventor: Yoshiaki Satoh, Hachiohji, Japan

[73] Assignee: Olympus Optical Co., LTD., Tokyo, Japan

[21] Appl. No.: 840,847

[22] Filed: Apr. 17, 1997

Related U.S. Application Data

[63] Continuation of Ser. No. 301,632, Sep. 7, 1994, abandoned.

[30] Foreign Application Priority Data

Sep. 7, 1993 [JP] Japan .................... 5-246392

[51] Int. Cl.[6] .................................. G06F 3/00
[52] U.S. Cl. ................................... 395/309
[58] Field of Search ................ 395/309, 281, 395/282, 800, 284

[56] References Cited

U.S. PATENT DOCUMENTS

| | | | |
|---|---|---|---|
| 3,906,163 | 9/1975 | Brenski | 364/550 |
| 4,028,682 | 6/1977 | Weber | 340/172.5 |
| 4,991,085 | 2/1991 | Pleva | 326/82 |
| 5,109,517 | 4/1992 | Houda | 395/800 |
| 5,317,748 | 5/1994 | Shimuzu | 395/775 |
| 5,335,352 | 8/1994 | Yanai | 395/800 |
| 5,446,869 | 8/1995 | Padgett | 395/500 |
| 5,513,365 | 4/1996 | Cook | 395/800 |

Primary Examiner—Ayaz R. Sheikh
Assistant Examiner—Paul R. Myers
Attorney, Agent, or Firm—Cushman Darby & Cushman, IP Group of Pillsbury, Madison & Sutro L.L.P.

[57] ABSTRACT

A CPU 1 and card slots 3A to 3C are connected to one another through an interface circuit 2. The interface circuit 2 effects the selection of necessary card slots and the selective supply of read and write signals. The CPU 1, the interface circuit 2 and the card slots 3A to 3C are interconnected by the data and address buses for signal transmission and reception.

2 Claims, 12 Drawing Sheets

| | CONTROL SIGNAL |
|---|---|
| ATTRIBUTE MEMORY | • SELECT<br>• REG, COE, CWE |
| IC MEMORY CARD | • SELECT<br>• COE, CWE |
| I/O CARD | • SELECT<br>• REG, IOOE, IOWE |

FIG. 11

| OPERATING SITUATION | LED DRIVING SIGNAL SOURCE | LED DISPLAY MODE |
|---|---|---|
| WHEN MEDIUM IS LOADED | PORT OUTPUT | FLICKERING 3 TIMES AT 1 SEC. INTERVAL |
| WHEN SEVERAL BYTES ARE RECORDED | PORT OUTPUT | LIT FOR 1 SEC. |
| WHEN A LARGE NUMBER OF BYTES ARE ACCESSED SUCH AS DMA TRANSFER | ENABLE SIGNAL | FLICKERING WITH TIMING OF ENABLE SIGNAL |

IMAGE PROCESSING SYSTEM

This is a continuation of application Ser. No. 08/301,632, filed Sep. 7, 1994, now abandoned.

BACKGROUND OF THE INVENTION

The present invention relates to image processing systems. More particularly, it relates to an image processing system, which is capable of common use for such media as IC memory cards and I/O cards, and also in which a plurality of such cards can be loaded at a time.

In a digital still camera, or the like data processing system, IC memory cards are used as the data recording medium and interface (I/O) cards are used for data exchange between the system and an external peripheral system. A plurality of such cards are often used, and there is a requirement for using such cards in the image processing system by loading the cards in independently provided card slots is typically required. Among the I/O cards are HD type cards, SCSI cards, Modem cards, LAN cards, RS-232C cards, Flash cards, Ethernet cards, SRAM cards, or complexed (multi-function) cards having such functions as, for instance, SCSI function and flash memory function, etc.

Until now, there has not been proposed any such system capable of meeting the above requirement, but such a system may conceivably have the structure shown in FIG. 12.

In FIG. 12, a plurality of (i.e., three in this example) card slots 13A to 13C, in which the respective cards are to be loaded, are connected to associated ports of CPU 1 via bus and control lines. The bus comprises a data bus and an address bus, and the control lines comprise a read (RD) signal line, a write (WR) signal line and a select signal line.

Thus, in the image processing system, it is necessary to provide a plurality of control signal lines and a CPU port for each of the card slots. Therefore, a large number of CPU ports have to be provided as exclusive ports, thus increasing the restrictions imposed on the system design.

SUMMARY OF THE INVENTION

An object of the present invention is to provide an image processing system loaded with a plurality of cards, such as IC memory cards, I/O cards, complexed (multi-function) cards having a plurality of functions and the like, capable of easily utilizing the loaded cards.

According to the present invention, in an image processing system capable of commonly using different media, such as IC memory cards and I/O cards and in which a plurality of cards can be loaded, data transmitted from a CPU is decoded to form a switching control signal and a plurality of select signals corresponding to the respective medium loading units. Output enable signals and write enable signals, corresponding to the respective different types of media capable of selective loading in the medium loading unit, are produced according to the switching control signal.

According to another aspect of the present invention, there is provided an image processing system comprising: a plurality of medium each processing an image data; a controller which generates a plurality of enable signals each corresponding to each of the medium for accessing the corresponding medium; a plurality of display elements each corresponding to each of the medium for indicating an access state thereof; and a plurality of switching circuits each corresponding to each of the medium for actuating the corresponding display element in response to the corresponding enable signal.

According to a further aspect of the present invention, there is provided an image processing system comprising: a plurality of medium each processing an image data; a controller which generates a plurality of enable signals for accessing the corresponding medium and a plurality of driving signals each corresponding to each of the medium; a plurality of display elements each corresponding to each of the medium and driven by the corresponding driving signal for indicating an access state thereof; a plurality of OR gate circuits each corresponding to each of the medium and supplied with the enable signal and the driving signal corresponding to each of the medium; and a plurality of switching circuits each corresponding to each of the medium and driven by an output of the corresponding OR gate circuit for actuating the corresponding display element.

BRIEF DESCRIPTION OF THE DRAWINGS

FIG. 11 is a table showing the operating situation, LED driving method (driving signal source) and LED display mode;

PREFERRED EMBODIMENTS OF THE INVENTION

Preferred embodiments of the present invention will now be described with reference to the attached drawings.

Figure 1:
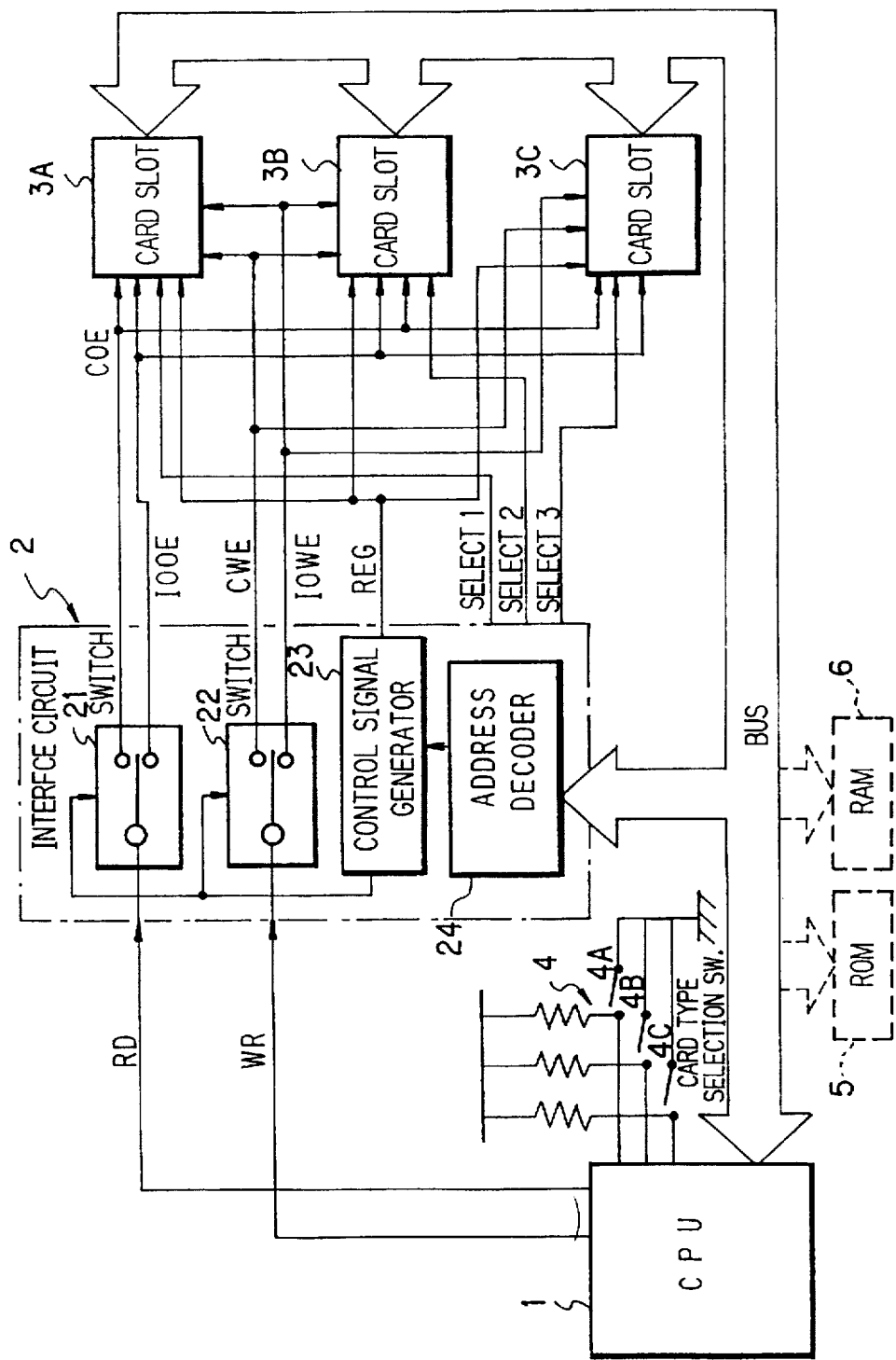
FIG. 1 is a block diagram showing an embodiment of the image processing system according to the present invention.

FIG. 1 is a block diagram showing an embodiment of the image processing system according to the present invention.

In this embodiment, CPU 1 and card slots 3A to 3C are connected to one another through interface circuit 2. Interface circuit 2 effects the selection of necessary card slots and the selective supply of read and write signals. Further, CPU 1, interface circuit 2 and card slots 3A to 3C are interconnected by data and address buses for signal transmission and reception.

Figures 2, 3:
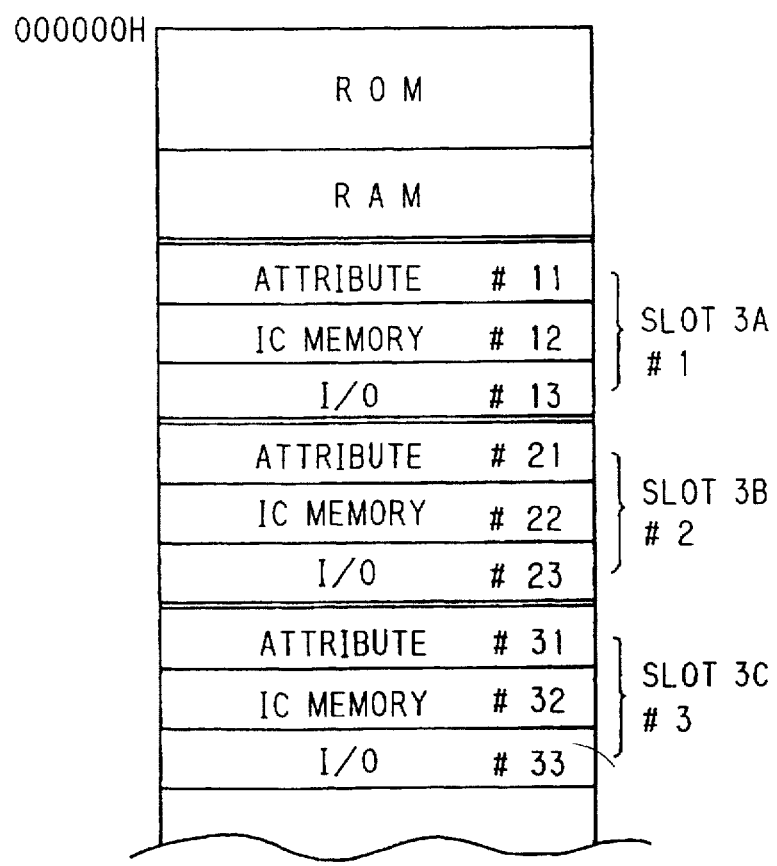
FIG. 2 shows control signals supplied to the attribute memory, IC memory card and I/O card.
FIG. 3 shows an example of a memory map as a virtual memory area viewed from the side of CPU 1 and accessible from the CPU via a bus connected thereto.

The IC memory card or I/O card has an attribute memory area with its attribute information stored therein. As noted above, the select signal and read and write signals are supplied as control signals to the card. FIG. 2 shows control signals supplied to the attribute memory, IC memory card and I/O card. The control signals supplied to the attribute memory are an REG signal as an access signal, a COE signal as a read signal, a CWE signal as a write signal and a select signal. The signals supplied to the IC memory card are the COE signal as a read signal, the CWE signal as a write signal and a select signal. The signals supplied to the I/O card are the REG signal as an access signal, an IOOE signal as a read signal, an IOWE signal as a write signal, and a select signal.

FIG. 3 shows an example of a memory map as a virtual memory area viewed from the side of CPU 1 and accessible from the CPU via a bus connected thereto. The memory map area as illustrated includes an area of ROM 5 (FIG. 1) in which programs instructing process routines in CPU 1 are stored, an area of RAM 6 (FIG. 1) as work area, and following areas #1 to #3 for the respective card slots 3A to 3C. The areas #1 to #3 include attribute areas #11, #21 and #31, IC memory areas #12, #22 and #32 and I/O card areas #13, #23 and #33.

In FIG. 1, interface circuit 2 includes switches 21 and 22, control signal generator 23 and address decoder 24. Switches 21 and 22 are controlled by a switching signal from control signal generator 23. Read signal RD generated from CPU 1 is supplied as the COE or IOOE signal through switch 21 to card slots 3A to 3C. Write signal WR generated from CPU 1 is supplied as the CWE or IOWE signal through switch 22 to card slots 3A to 3C.

Address decoder 24 decodes address values supplied from CPU 1 via the address bus and supplies the select signal to the corresponding card slot, while outputting the decoded value to control signal generator 23. In response to the signal from address decoder 24, control signal generator 23 supplies a switching signal for switching either the I/O card or the IC memory card to the switches 21 and 22, and it also supplies the REG signal for the attribute memory or I/O card to card slots 3A to 3C. A card type selection switch 4 including switches 4A to 4C is for forcibly setting the card to be used to a specific type of card. By turning on switches 4A to 4C, either of card slots 3A to 3C is set, for example, to forcibly access an IC memory card.

Figure 4:
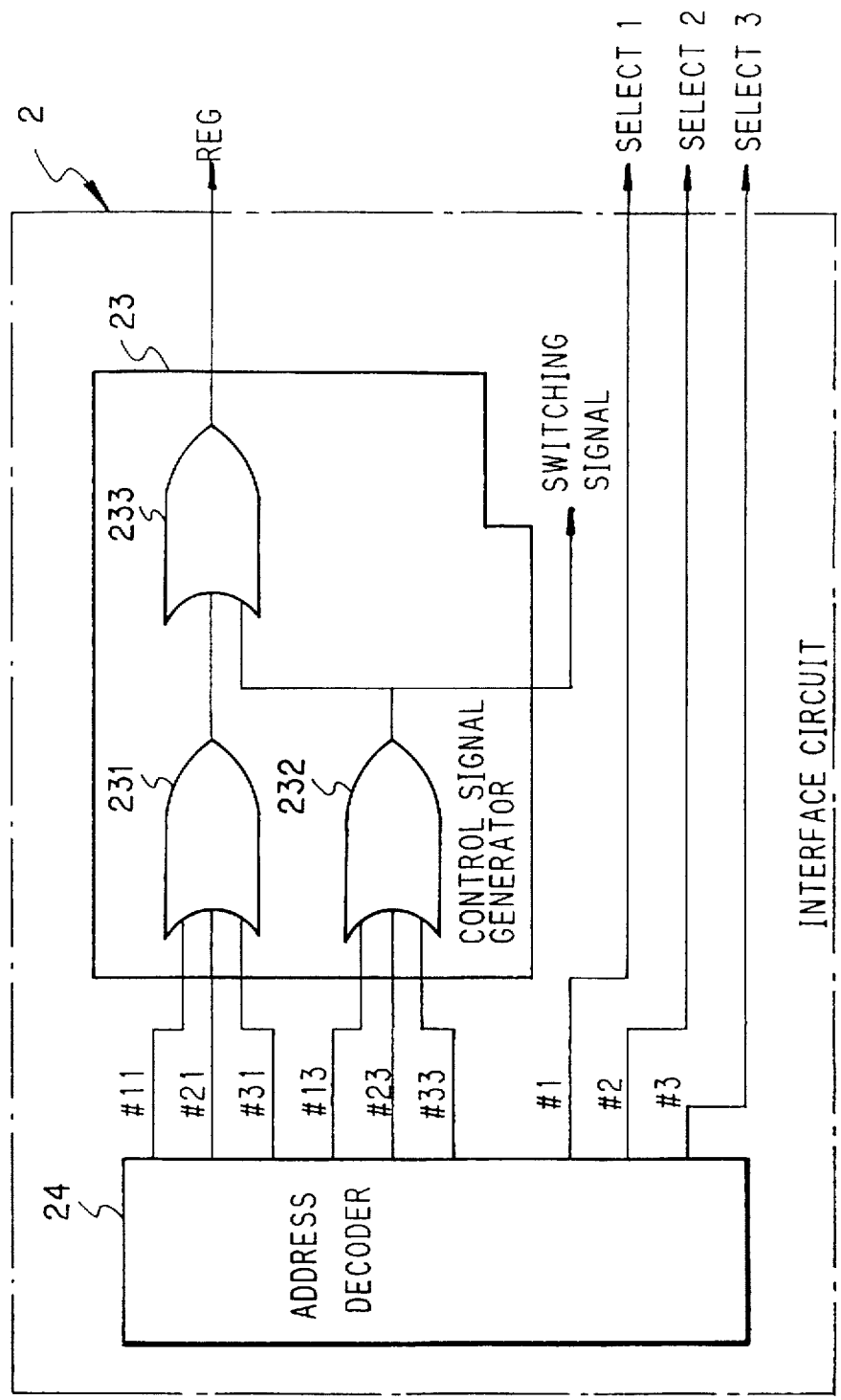
FIG. 4 shows an example of the structure of interface circuit 2.

FIG. 4 shows an example of the structure of interface circuit 2. Control signal generator 23 in interface circuit 2, has OR gates 231 to 233.

The attribute area addresses #11, #21 and #31 provided from CPU 1 as a result of address decoding in address decoder 24 are supplied to OR gate 231 in control signal generator 23. The I/O card addresses #13, #23 and #33 are supplied to OR gate 232. The output of OR gate 232 is supplied as the switching signal for switching the switches 21 and 22. The outputs of OR gates 231 and 232 are supplied to OR gate 233. The output of OR gate 233 is provided as the REG signal. Address decoder 24 supplies select signals 1 to 3 for the respective card slots according to the address decoded values from CPU 1.

Figure 5:
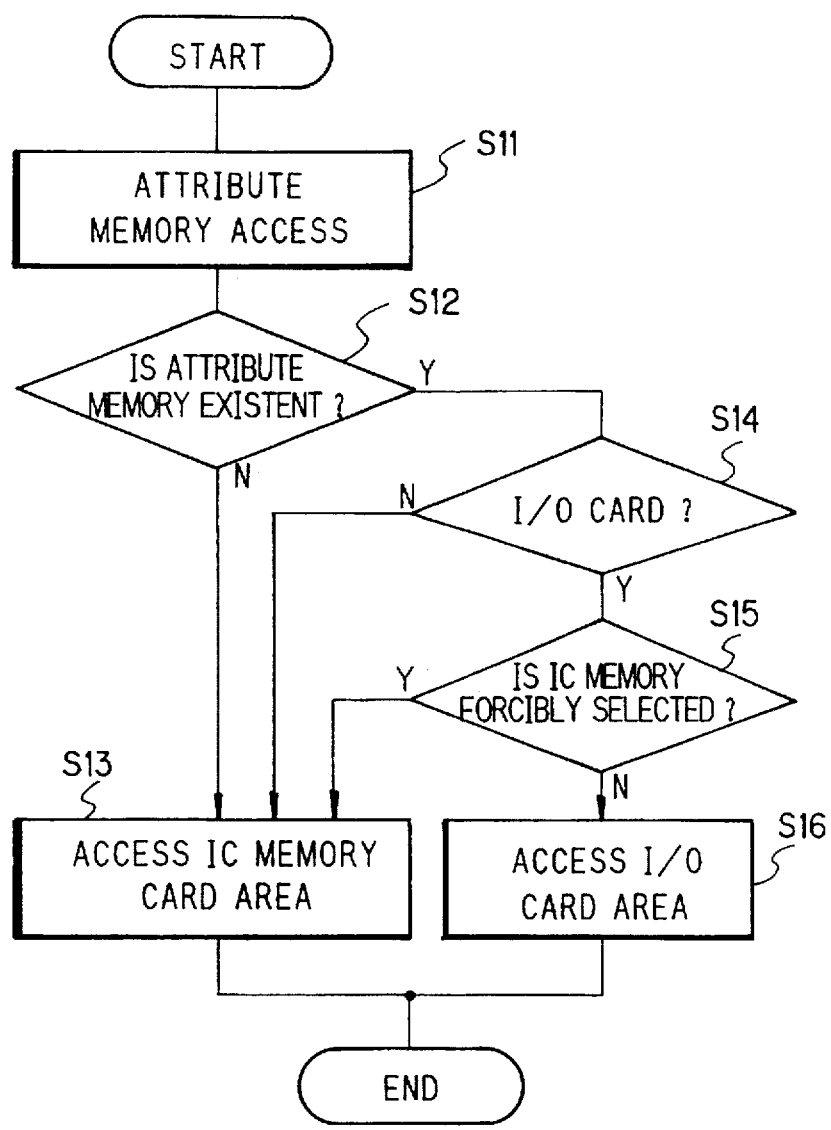
FIG. 5 is a flow chart showing the operation routine in the present embodiment when a card is loaded in card slot 3A.

FIG. 5 is a flow chart showing the operation routine in the present embodiment when a card is loaded in card slot 3A.

The IC memory card is necessarily provided with attribute memory, while the I/O card is not necessarily provided with attribute memory. Accordingly, it is possible to judge the card as the IC memory card if there is no attribute memory, and as the I/O card or IC memory card if there is attribute memory.

After the start of the operation, the attribute memory area #11 is accessed (step S11), and a check is done as to whether there is an attribute memory (step S12). If no attribute memory is found, the IC memory card area (access memory space #12) is accessed (step S13) to bring an end to the routine. If the attribute memory is found, a check is done as to whether there is an I/O card (step S14).

If the card checked in the step S14 is not an I/O card, the step S13 noted above is executed. If the checked card is an I/O card, a check is done as to whether an IC memory card has been forcibly selected by the card type selection switch 4. When the complexed card is inserted therein, it is judged which function is to be selected. The card type is set through the user's operation of the card type selection switch 4 or through the program of the CPU 1 (step S15). If it is found that this card has been selected, the step S13 is executed. Otherwise, the I/O card area (access memory space #13) is accessed (step S16), thus bringing an end to the routine.

Now, a second embodiment of the present invention will be described.

In the second embodiment, the memory address area in the CPU is commonly used for saving the address memory area. To this end, a switching signal for switching the I/O and IC memory cards is provided from the CPU.

Figure 6:
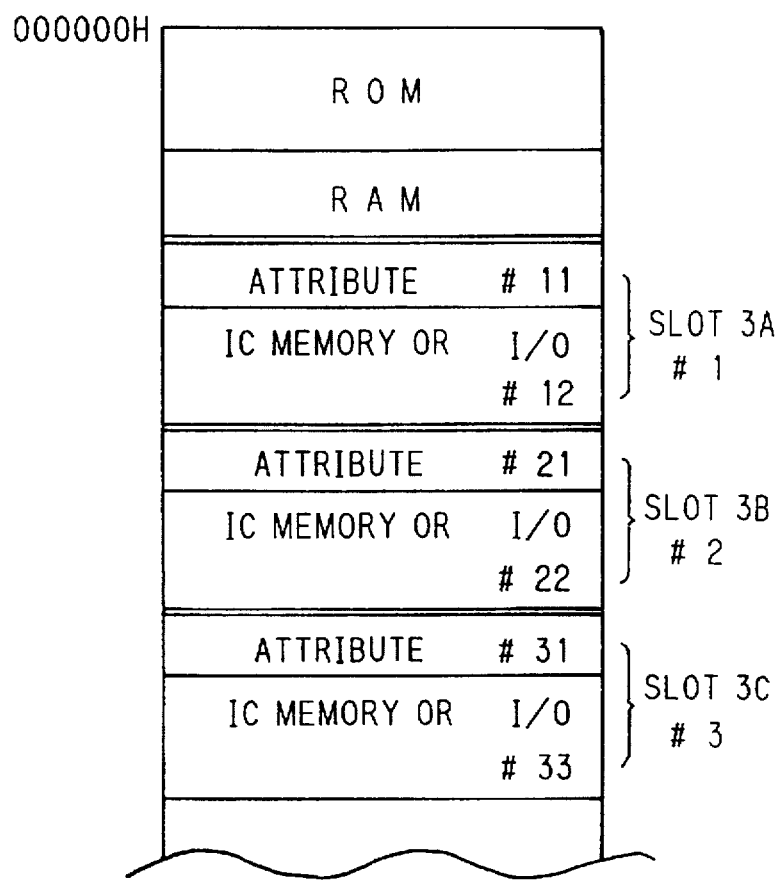
FIG. 6 shows an example of the memory map of the CPU.

FIG. 6 shows an example of the memory map of the CPU.

As is clear from comparison with FIG. 3, in the second embodiment an area which is common to the I/O and IC memory card areas is provided for each of card slots 3A to 3C.

Figure 7:
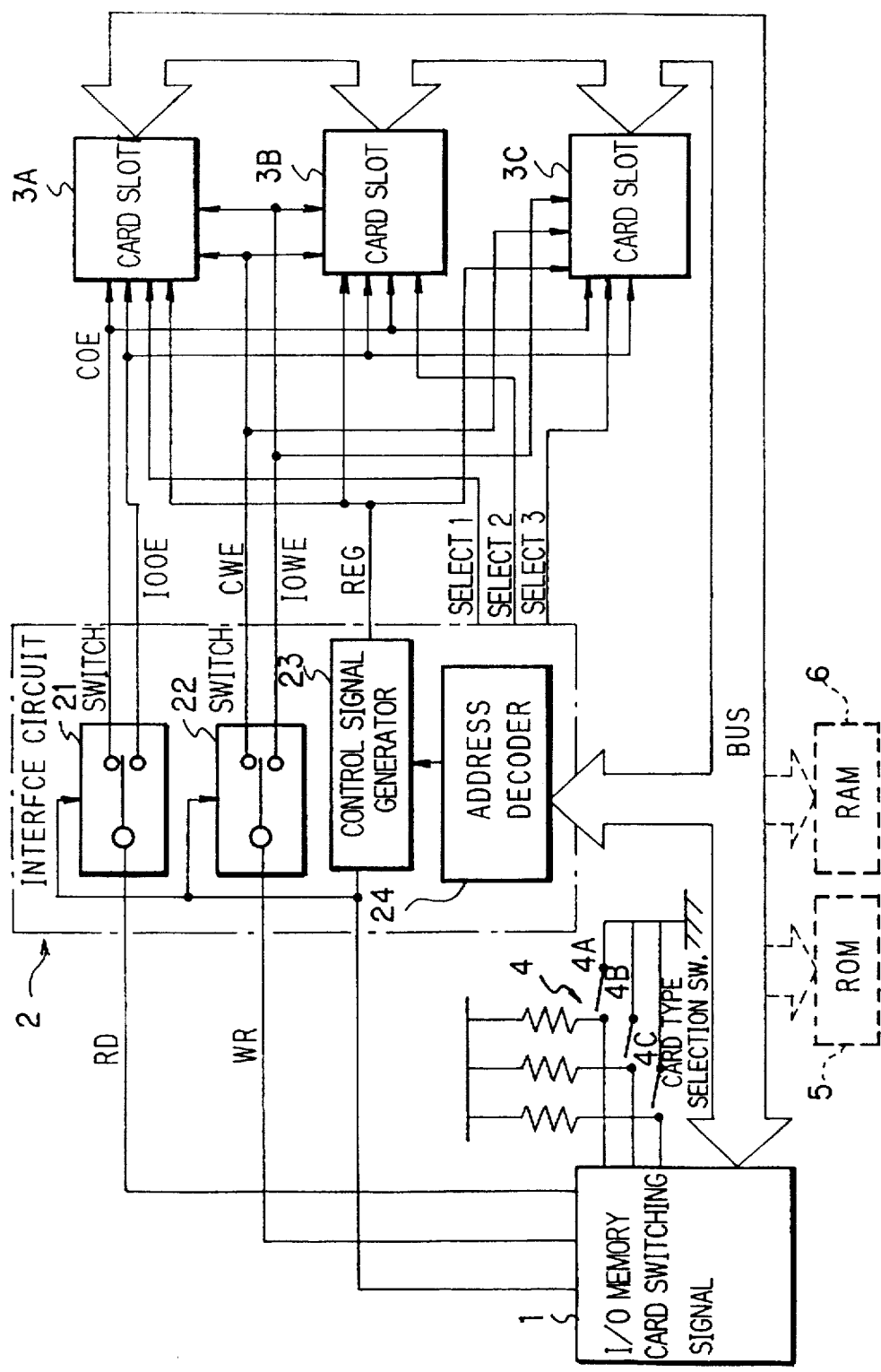
FIG. 7 is a block diagram showing an embodiment of the image processing system.

FIG. 7 is a schematic block diagram showing the second embodiment of the image processing system.

Figure 8:
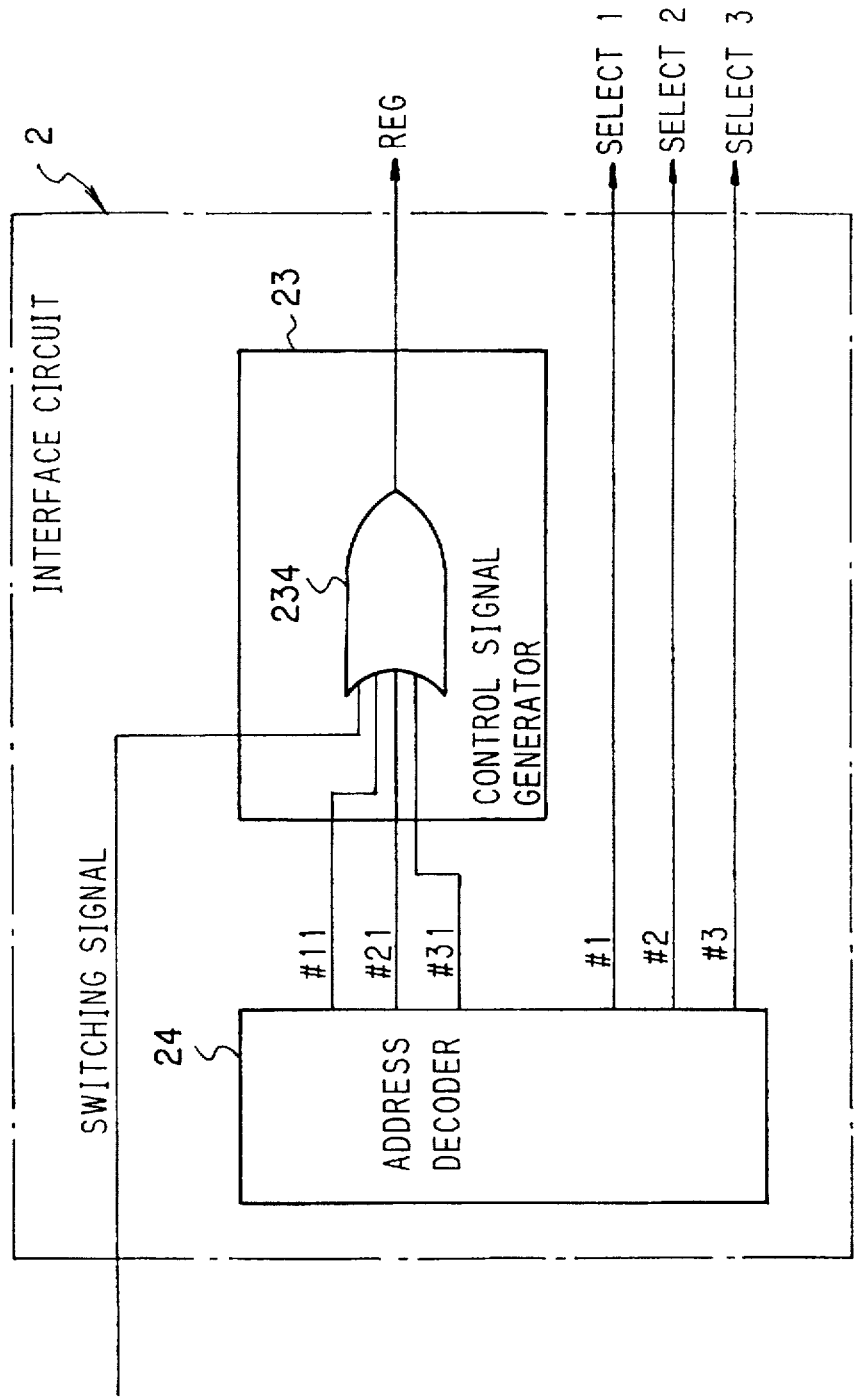
FIG. 8 shows the structure of control signal generator 23 in interface circuit 2.

CPU 1 supplies a switching signal for switching the switches 21 and 22 and control signal generator 23. FIG. 8 shows the structure of control signal generator 23 in interface circuit 2. The decode data in the attribute areas #11, #21 and #31 from the address decoder and the switching signal for switching the I/O and IC memory cards from CPU 1 are supplied to OR gate 234, the output of which is supplied as a REG signal to card slots 3A to 3C.

The second embodiment permits memory space reduction as compared to the first embodiment. Memory space is effectively reduced since it is limited by the number of bus lines.

In the meantime, while a memory card or the like data storage device is accessed from a system controller in the image processing system, an LED, for instance, is lit to notify the user of the access operation. (Other messages are similarly provided.)

Figure 13:
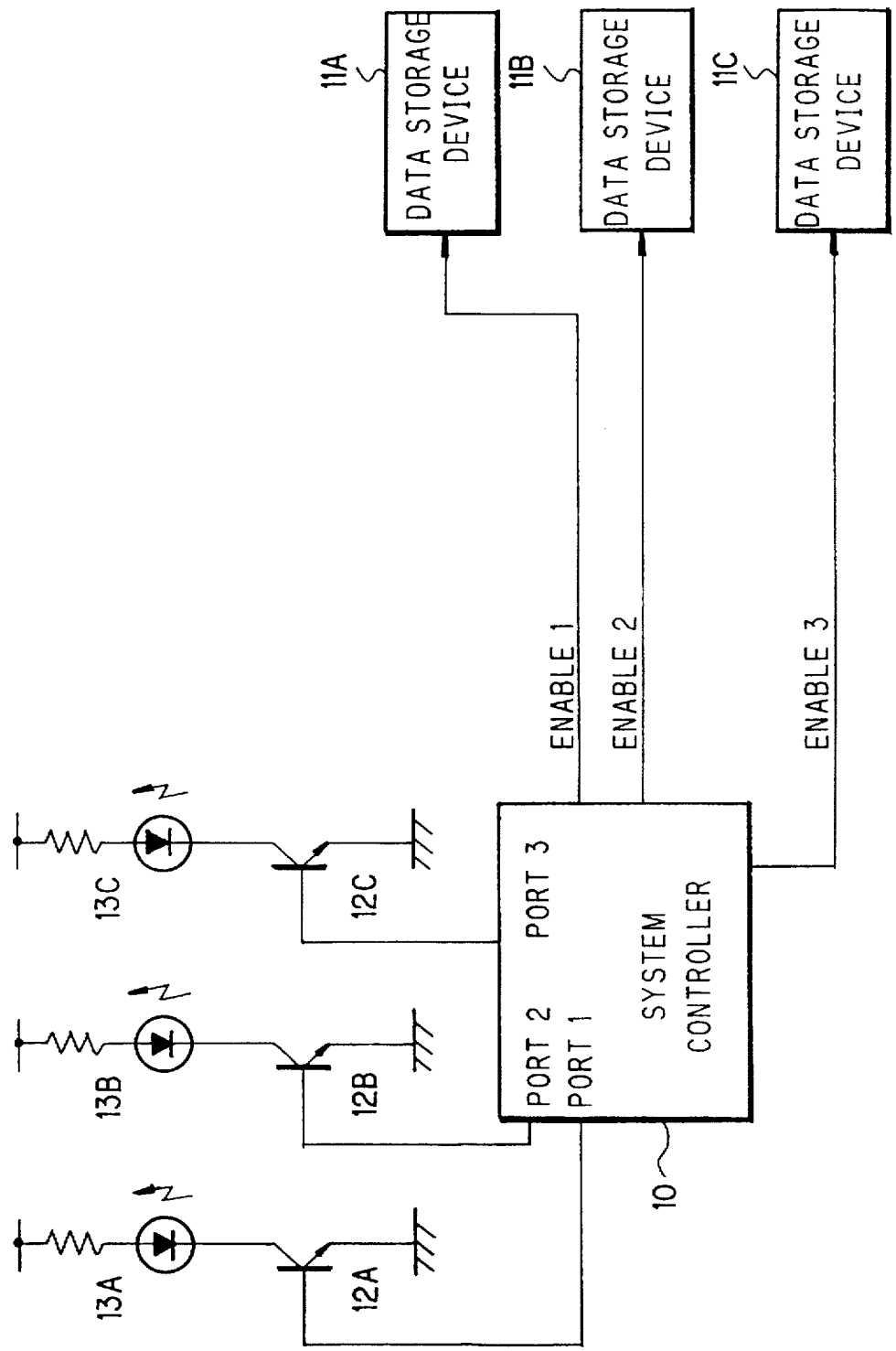
FIG. 13 shows the prior art structure of an image processing system.

FIG. 13 shows a prior structure of the image processing system. The system controller 10 supplies enable signals 1 to 3 to data storage devices 11A to 11C which may be card slots, floppy disk drives, etc., and it also supplies, from its ports 1 to 3, signals for turning on switching transistors 12A to 12C. LEDs 13A to 13C are respectively connected between each of the switching transistors 12A to 12C and a reference potential terminal. When a transistor is turned on, the associated LED is turned on.

As described above, the LED lighting for notifying the access operation state with respect to the data storage device is caused by a signal output from the system controller port. However, this means that system controller ports corresponding in number to the number of LEDs are required. This leads to a wasteful use of ports. Besides, in the event of an erroneous system controller port output an LED may be lit even though no data storage device is accessed, thus causing user confusion.

Figure 9:
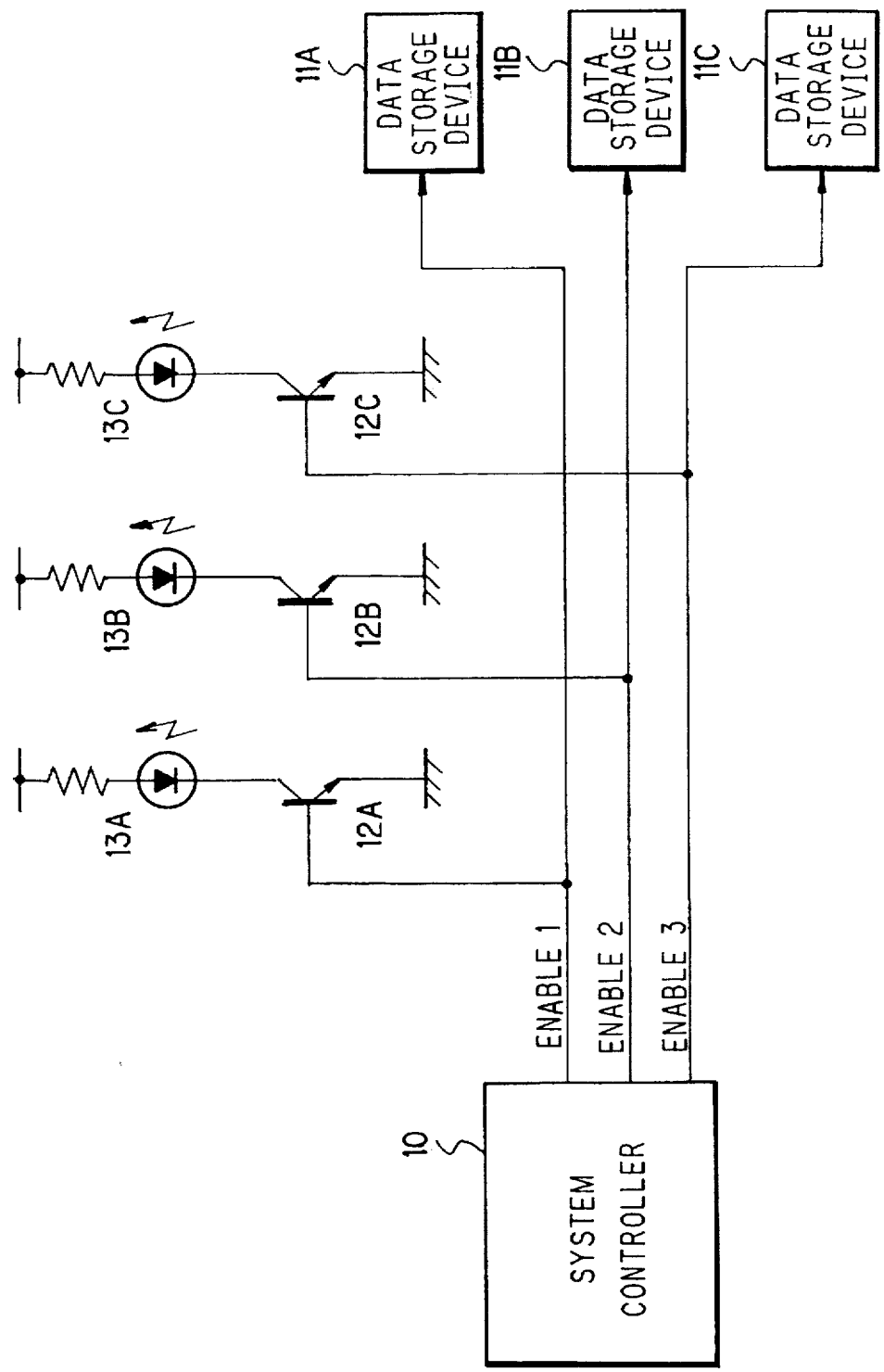
FIG. 9 shows an embodiment of the present invention, which can eliminate the above wasteful use of system controller ports.

FIG. 9 shows an embodiment of the present invention which can eliminate the above described wasteful use of system controller ports. In this instance, switching transistors 12A to 12C are directly turned on by enable signals 1 to 3, respectively. The enable signals are also supplied to corresponding data storage devices. Thus, the enable signals access the data storage devices and turn on the associated LEDs. In this way, it Is possible to save the number of system controller ports and accurately display the state data storage device access operation with minimum necessary hardware structure and regardless of whether the system controller is normal or not.

Figure 10:
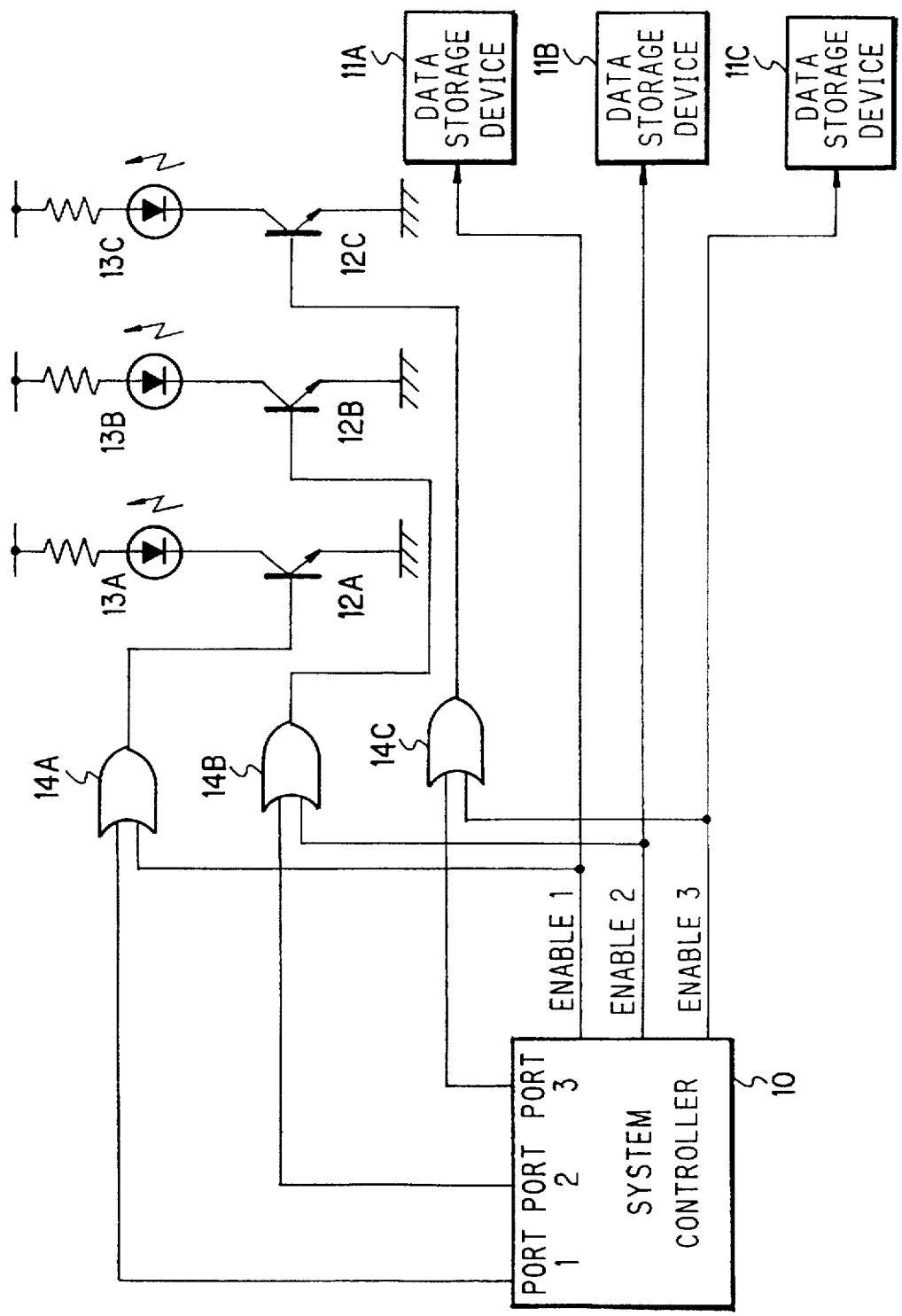
FIG. 10 is a block diagram showing a modification of the structure shown in FIG. 9.
Figure 12:
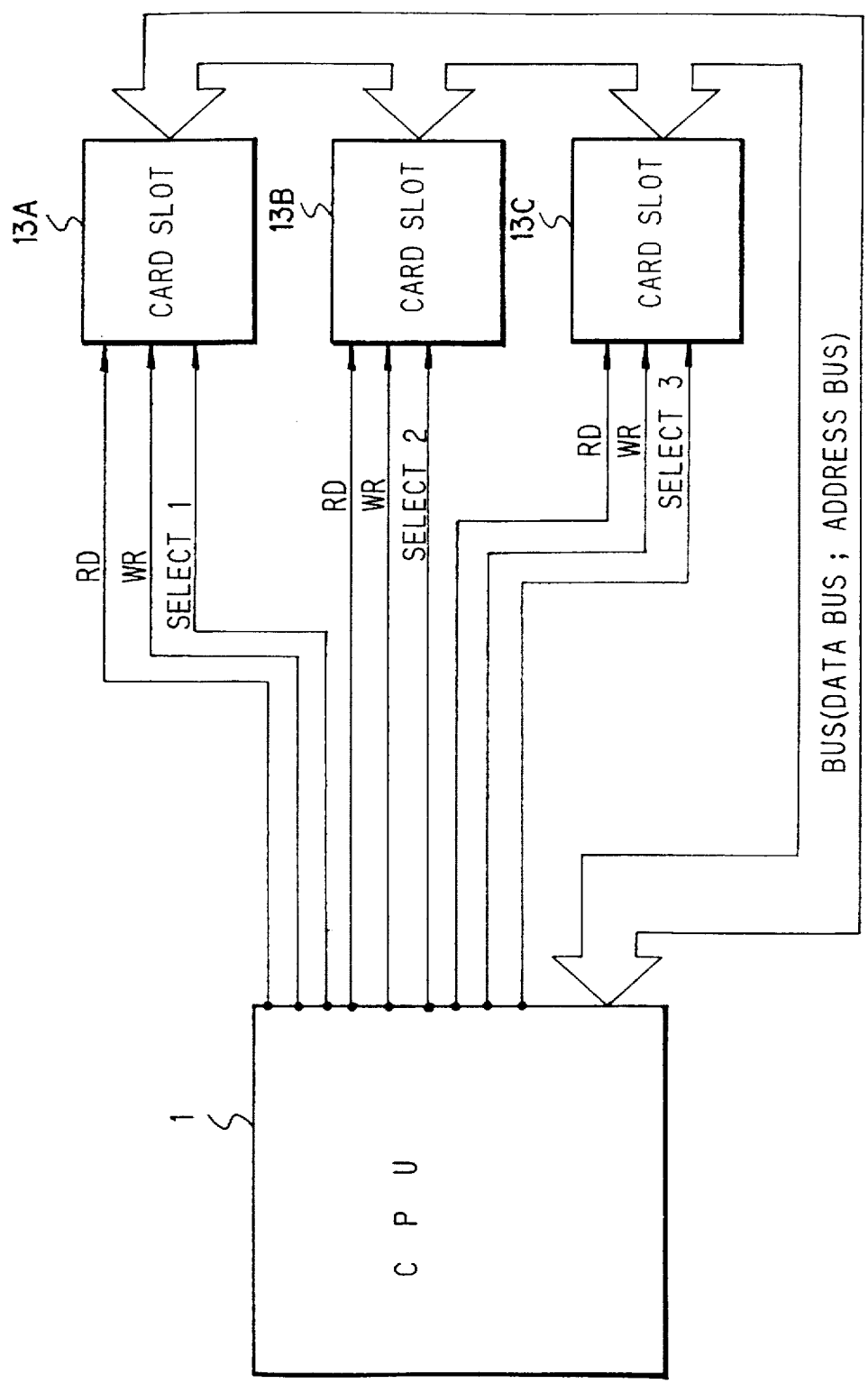
FIG. 12 is a conceivable structure of an image processing system in which cards are loaded in independently provided card slots.

FIG. 10 is a schematic block diagram showing a modification of the structure shown in FIG. 9.

In this embodiment, which is based on the prior art structure shown in FIG. 13, OR gates 14A to 14C are connected to the bases of the corresponding switching transistors 12A to 12C. To OR gates 14A to 14C are respectively supplied a signal from the system controller port 1 and an enable signal 1, a signal from the system controller port 2 and an enable signal 2, and a signal from the system controller port 3 and an enable signal 3. The outputs of OR gates 14A to 14C are respectively supplied to the base of switching transistors 12A to 12C.

In this embodiment, by using OR gates 14A to 14C for notifying the user of the loading of a data recording medium and also access thereto even using several bytes it is possible to change the display mode as desired in accordance with various situations, for instance, to a mode for lighting an LED for at least one second. In this case, if the lighting time of the LED is too long, it can be clearly recognized that the system controller operation is abnormal.

FIG. 11 is a table showing the Operating Situation, LED Driving Source (LED driving method) and LED Display Mode.

At the time of the loading of a medium, an LED is driven by a port output for flickering three times at an interval of one second. When accessing by several bytes, an LED is driven by a port output but is lit for one second. At the time of access by a large number of bytes such as DMA transfer, an LED is driven by an enable signal for flickering with the timing of the enable signal.

As has been described in the foregoing, the image processing system according to the present invention is operable with a plurality of data recording media, such as IC memory cards and I/O cards, loaded on it for accessing with a simple structure, and further it permits ready design and mounting of printed circuit boards.

What is claimed is:

1. An image processing system comprising:

a plurality of medium loading units for selectively loading a plurality of different data recording media or media with data transfer function with respect to external apparatus;

a selection switch for selecting a function of a multi-function card loaded in at least one of said plurality of medium loading units;

a central processing unit having an accessible virtual memory area inclusive of attribute areas, IC memory areas and I/O card areas corresponding to said medium loading units respectively, and said attribute areas being accessed prior to all others so as to discriminate types of loaded cards;

data bus and address bus connecting said central processing unit and said plurality of medium loading units; and an interface circuit including first and second circuit sections;

said first circuit section being connected to said central processing unit via a read command line, a write command line and the data and address buses and serving to decode data transmitted from said central processing unit via send data and address buses so as to form a switching control signal and a plurality of select signals each corresponding to each of said plurality of medium loading units;

said second circuit section serving to assign signals transmitted via the read and write command lines as a plurality of different output enable signals and a plurality of different write enable signals corresponding to different types of media selectively loaded in said plurality of medium loading units to corresponding predetermined output terminals according to the switching control signal.

2. The image processing system as set forth in claim 1 further comprising a second selection switch for selecting one of said plurality of medium.

* * * * *